1

United States Patent
Pettegrew et al.

(10) Patent No.: US 12,527,734 B2
(45) Date of Patent: Jan. 20, 2026

(54) SKINCARE COMPOSITION UTILIZING A METABOLOMICS GUIDED, BIOPROCESS ENGINEERED SUNFLOWER SPROUT ACTIVE

(71) Applicant: JAMRM, LLC, Dallas, TX (US)

(72) Inventors: Jay W. Pettegrew, Bradenton, FL (US); Alisar Salah Zahr, Dallas, TX (US); John Koch, Fort Worth, TX (US); Tatiana Kelly, Westlake, TX (US); Marilyn Pettegrew, Bradenton, FL (US)

(73) Assignee: JAMRM, LLC, Dallas, TX (US)

( * ) Notice: Subject to any disclaimer, the term of this patent is extended or adjusted under 35 U.S.C. 154(b) by 109 days.

(21) Appl. No.: 17/841,038

(22) Filed: Jun. 15, 2022

(65) Prior Publication Data

US 2023/0404902 A1 Dec. 21, 2023

(51) Int. Cl.
*A61K 8/36* (2006.01)
*A61K 8/22* (2006.01)
*A61K 8/55* (2006.01)
*A61K 8/60* (2006.01)
*A61K 8/97* (2017.01)
*A61Q 19/00* (2006.01)
*A61Q 19/08* (2006.01)

(52) U.S. Cl.
CPC ............. *A61K 8/97* (2013.01); *A61K 8/22* (2013.01); *A61K 8/55* (2013.01); *A61K 8/60* (2013.01); *A61Q 19/00* (2013.01)

(58) Field of Classification Search
None
See application file for complete search history.

(56) References Cited

U.S. PATENT DOCUMENTS

| | | | |
|---|---|---|---|
| 7,407,778 B2 * | 8/2008 | Pettegrew | A23L 33/175 514/556 |
| 7,632,662 B2 | 12/2009 | Pettegrew et al. | |
| 2006/0088614 A1 * | 4/2006 | Pettegrew | A61K 36/28 514/546 |
| 2009/0069423 A1 * | 3/2009 | Pettegrew | A61K 31/22 514/547 |
| 2009/0214504 A1 | 8/2009 | Carter et al. | |
| 2010/0303872 A1 | 12/2010 | Dumas et al. | |
| 2013/0209583 A1 * | 8/2013 | Pan | A61K 33/04 424/702 |

OTHER PUBLICATIONS

Budko, Neil, et al, Oxygen Transport and Consumption in Germinating Seeds, SWI 2013 Proceedings, pp. 5-30.
Gafner, Frank Dr., et al; The Intelligent Cell Protecting Factor Based on Sunflower Sprouts, Mibelle Biochemistry, Switzerland, Sep. 2011, info@mibellebiochemistry.com, www.mibellebiochemistry.com.
Schmid, Daniel Dr., et al, Mibelle Biochemistry, Switzerland, Shoots of Sunflowers to Power the Skin, Personal Care, Nov. 2010 pp. 45-47.
Schmit, Daniel et al; Vegetable Sprouts: A Potent Source for Cosmetic Actives; Natural/Botanics, Household and Personal Care Today—Jan./Mar. 2011, vol. 6(1).
Shoots of Sunflowers to Energize and Rejuvenate the Skin, HPC Product Focus, HPC Today Customer's' Publications, Focus on Amino Acids, Peptides & Hi-Tech Ingredients—Supplement to Household and Personal Care Today Apr. 2010.
Sunflower Shoot Active Time Fighting and Energizing, Mibelle AG Biochemistry, 5033 Buchs / Switzerland, Phone + 41 62 836 17 31, info@mibellebiochemistry.com, February 2018www.mibellebiochemistry.com.

* cited by examiner

*Primary Examiner* — Brian Gulledge
(74) *Attorney, Agent, or Firm* — Stephen Y. Liu; Carstens, Allen & Gourley, LLP (57) ABSTRACT

A skincare composition and a method for ameliorating the effects of aging. The skincare composition comprises an enhanced extract obtained from plant seeds germinated in an environment that includes an effective amount of sucrose and enriched levels of oxygen, and a cosmetically acceptable carrier.

16 Claims, 6 Drawing Sheets

SKINCARE COMPOSITION UTILIZING A METABOLOMICS GUIDED, BIOPROCESS ENGINEERED SUNFLOWER SPROUT ACTIVE

BACKGROUND

Technical Field

Novel aspects of the present disclosure relate to skincare compositions that include sunflower sprout extract for treating skin conditions. More specifically, novel aspects are directed to a metabolomics guided, bioprocess engineered sunflower sprout extract obtained from sunflower seeds germinated in a controlled environment where free fatty acids are broken down to create energy within cells which is important for vitality. Incorporation of the metabolomics guided bioprocess engineered sunflower sprout extract as an active in a skincare composition, working through epigenetic pathways, results in enhanced human gene expression as well as increased protein and lipid production in manner correlated with anti-aging effects.

Background

Human skin is a multi-layered tissue that is complex in terms of its structure as well as in terms of its biochemistry. As skin ages over time, its visible appearance and texture changes. These changes are a result of both extrinsic and intrinsic factors. Some examples of extrinsic factors that cause aging of the skin include nutrition, and exposure to solar radiation, pollution, and high energy visible light from electronic devices. Topically applied formulations have been used to minimize or reverse these changes. As the study of the human skin continues to progress, novel treatments for ameliorating skin aging are being developed.

SUMMARY OF THE INVENTION

Novel aspects of the present disclosure are directed to a skincare formulation that includes a metabolomics guided, bioprocess engineered sprout extract mixed with a cosmetically acceptable carrier. The metabolomics guided, bioprocess engineered sprout extract is obtained from plant seeds germinated in an environment enhanced with the addition of an effective amount of sucrose and enriched with increased levels of oxygen.

Novel aspects of the present disclosure are also directed to a method of ameliorating the effects of skin aging, the method including the steps of applying a skincare composition to human skin, the skincare composition comprising a cosmetically acceptable carrier mixed with a metabolomics guided, bioprocess engineered sprout extract obtained from plant seeds germinated in an environment enhanced with the addition of an effective amount of sucrose and enriched with increased levels of oxygen.

Novel aspects of the present disclosure are also directed to a method of preparing a skincare formulation for use in ameliorating the effects of aging, the method including the steps of obtaining a metabolomics guided, bioprocess engineered sprout extract formed from plant seeds germinated in an environment enhanced with the addition of sucrose and enriched with increased levels of oxygen, and mixing the metabolomics guided, bioprocess engineered sprout extract with a cosmetically acceptable carrier.

Other aspects, embodiments and features of the invention will become apparent from the following detailed description of the invention when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

With age, human skin cells produce less energy and fewer antioxidants. In addition, there is an increase in the level of matrix metalloproteinases (MMPs), enzymes which degrade extracellular matrix (ECM) proteins, resulting in a loss of elasticity and firmness. Examples of ECM proteins include collagen and elastin. Various studies such as gene array analysis and in vitro experimentation have shown that certain skincare ingredients can have a beneficial effect on the structure and function of the skin. These ingredients, through epigenetic effects, can beneficially modulate the expression of genes that are specifically correlated with minimizing the aging process. For example, certain ingredients can upregulate the expression of genes involved in the production of cellular energy. Alternatively, certain ingredients can downregulate the expression of genes associated with production of MMPs which degrade valuable ECM proteins. These types of skincare actives are the focus of continued research.

Consumers have increasingly shown a preference for skincare compositions with actives that are derived from natural, non-genetically modified, plant-based ingredients. Extracts based upon the sunflower plant and seeds have been investigated as a source for cosmetic actives because the sunflower plant and seeds are widely available, can grow in many different types of soil, and have exhibited natural allelopathic potential (i.e., the ability to inhibit or stimulate biological interactions by the release of biochemicals). Conventionally, sunflower-based extracts used in skincare compositions as a plant-based active utilized sunflower seed extract derived from sunflower seeds harvested under normal growth conditions, or from sunflower shoots harvested from hydroponically cultivated sunflower seeds that first soaked in water for two days before being transferred to rotating containers for a four-day incubation period.

These conventional skincare compositions that include the above-referenced sunflower extracts are incomplete solutions that fail to take advantage of the full spectrum of possible plant genome expression, which can be tapped via metabolomics guided, bioprocess engineering. The metabolomics guided, bioprocess engineering alters plant genome expression without alteration of the genome itself, resulting in the production of metabolites that are not ordinarily produced during normal growth conditions, or only produced in limited amounts. A metabolomics guided, bioprocessing method is discussed utilizing the addition of sugar and oxygen which optimizes the germination process of sunflower seeds and enhances the formation of beneficial metabolites in germinating sunflower sprouts, including the presence of L-carnitine (LCAR), acetyl-L-carnitine (ALCAR), L-alpha-phosphatidylcholine, galactose phosphate, glucose phosphate, adenosine triphosphate, inositol, triglycerides, docosahexaenoic acid (DHA) and eicosapentaenoic acid (EPA).

While some evidence suggests that the consumption of LCAR and ALCAR metabolites isolated from sunflower seeds germinated according to the metabolomics-guided bioprocess method are beneficial in the treatment of neurological disorders, available literature fails to describe the effect of LCAR and ALCAR, along with the full spectrum metabolites formed from bioprocess engineering of a sunflower sprout extract, on reversing the effects of aging on human skin. To this end, novel aspects of this disclosure provide an enhanced sunflower sprout extract formed from a metabolomics guided, bioprocess engineering method of germinating sunflower seeds which produces metabolites crucial for skin health and anti-aging purposes which are either not present in conventionally germinated sunflower seeds, or only present at ineffective amounts. For example, an enhanced extract obtained from a sunflower sprout germinated in an environment that is enriched an enhanced in oxygen and an effective concentration of a sucrose solution demonstrates a 1000-fold increase in the amount of LCAR and ALCAR, metabolites that are not normally produced in sprouts or produced in very limited quantities. The inclusion of the enhanced sunflower sprout extract in a cosmetically acceptable carrier for use as a skincare composition has been shown, through epigenetic processes, to boost cellular energy, enhance skin radiance and suppleness, optimize the epidermal barrier, increase skin elasticity and firmness, and promote long-term skin health.

Various embodiments disclosed herein describe a metabolomics guided bioprocess engineered sunflower sprout extract, i.e., the enhanced extract, obtained from sunflower seeds for use as an active in a skincare composition to ameliorate the effects of aging, however other plant seeds may be substituted provided that the other plant seeds also have lipid reserves that are not stored in its endosperms. Sunflower seeds store lipid reserves in cotyledons.

Figure 1:
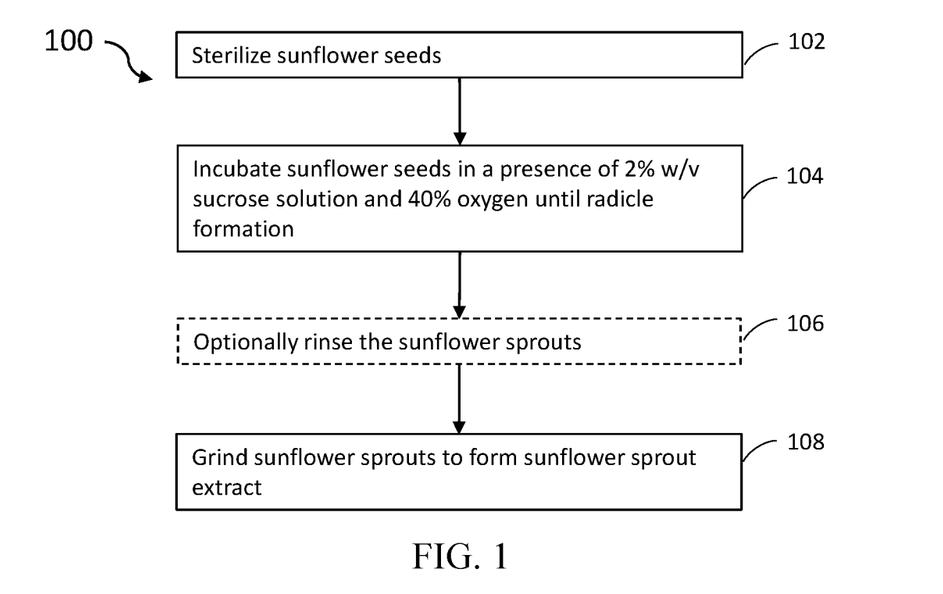
FIG. 1 is a flowchart of the steps for forming a metabolomics guided, bioprocess engineered sunflower sprout extract.

FIG. 1 is a flowchart of the steps for forming a bioprocess engineered sunflower sprout extract. The steps of this process in flowchart 100 are described in greater detail in U.S. Pat. No. 7,632,662, which is incorporated by reference herein in its entirety and also summarized here for ease of reference.

The metabolomics-guided bioprocessing method manipulates metabolic fluxes in germinating seeds to increase oxygen availability as well as provide an aseptic environment free of contamination, such as bacteria, viruses, or other harmful living organisms, to alter carbohydrate consumption and feedback repress gluconeogenesis. A resulting shift in sunflower seed fatty acid metabolism, phospholipid metabolism, and high-energy metabolism change the germination environment to increase beneficial metabolites, e.g., LCAR and ALCAR, and to produce longer chain fatty acid esters of carnitine, such as polyunsaturated fatty acid esters, e.g., eicosapentaenoyl-L-carnitine and docosa-hexaenyl-L-carnitine. In a non-limiting embodiment, the method manipulates the metabolic fluxes by providing a sucrose-controlled and oxygen-controlled environment.

Flowchart 100 begins at Step 102 by sterilizing sunflower seeds. In one embodiment, the sunflower seeds are sterilized to eliminate contaminants by the application of conventional sterilization solutions. The sterilization step may include a rinsing step with deionized water before sterilization and/or after sterilization.

In Step 104, the sterilized sunflower seeds are incubated in the presence of an effective amount of sucrose solution and 40% oxygen. In a non-limiting embodiment, the effective amount of sucrose solution for sunflower seeds is between 1% and 2% w/v, inclusive. In a particular embodiment, the effective amount of sucrose solution for sunflower seeds is 2% w/v. For example, the sunflower seeds can be placed into a vessel with an incubation medium formed from 2% w/v sucrose in deionized water with oxygen purged into the headspace of the vessel to maintain the 40% oxygen. The sunflower seeds can then be incubated in the vessel for at least 60 hours or at least until the point of radicle extension to form a metabolomics guided, bioprocess engineered sunflower sprout, i.e., the enhanced sprout. The term "sunflower sprout", when referring to a germinated sunflower seed subjected to metabolomics guided bioprocess engineering, means a sunflower seed that has been incubated in the presence of the effective amount of sucrose solution and 40% oxygen for at least 60 hours or at least until the point of radicle extension.

In Step 106, the sunflower sprouts are optionally rinsed. The rinse water can be deionized water or distilled water. In Step 108, the sunflower sprouts are ground into a paste to form the sunflower sprout extract. In one embodiment, the sunflower seeds are ground to a paste at liquid nitrogen temperatures, e.g., about −195° C. or −320° F.

To test the effect of the metabolomics guided, bioprocess engineered sunflower sprout extract on epigenetics and gene expression, skin harvested from the abdomen of a female donor and divided into three separate samples (n=3) was incubated in an incubation medium that included the enhanced extract in a concentration of 100% (w/w) and a water control for 24 hours and 20,000 genes were analyzed to determine the possible anti-aging effect on human skin.

Only genes exhibiting a significant fold change and a p-value of less than 0.05 were considered to have differential expression. The results are shown in Tables 1 and 2 below.

TABLE 1

Highly Upregulated Genes from Human Skin Samples.

| Upregulated Gene | Function |
|---|---|
| TMEM45 | Transmembrane Protein 45. Keratinocyte Development Gene. Highly expressed in epidermal keratinocytes (i.e., in the granular layer of the epidermis). |
| LCE1B | Late Cornified Envelope 1B. Protein that facilities in modulating epidermal barrier activity. |
| KRT2 | Keratin 2, Type 2. Associated with keratinocyte activation, proliferation and keratinization. Plays a role in the establishment of the epidermal barrier |
| GABRB3 | Gamma-Aminobutyric Acid Type A Receptor Subunit Beta 3. Gene codes for protein isoforms in the GABA receptor, a ligand-gated ion channel. Modulates epidermal barrier repair. |
| DEFB4A | Defensin, beta 4A. Promotes formation of anti-microbial peptides. |
| DCT | Dopachrome Tautomerase. Promotes photoprotection in melanocytes by the photoprotective skin pigment eumelanin; has a role in response to apoptotic stimuli and oxidative stress. |
| NDUFA10 | NADH: Ubiquinone Oxidoreductase Subunit A10. Encodes a protein that exhibits NADH dehydrogenase activity and oxidoreductase activity. Transfers electrons from NADH to the respiratory chain Important for mitochondria optimized function and cellular energy. |
| LIPN | Lipase Family Member N. This gene encodes a lipase that is highly expressed in granular keratinocytes in the epidermis, and plays a role in the differentiation of keratinocytes. |

TABLE 2

Highly Downregulated Genes from Human Skin Samples.

| Downregulated Gene | Function |
|---|---|
| IL6 | Interleukin 6. A cytokine which regulates immune response. |
| MMP2 | Matrix Metalloproteinase 2. A protein encoded by this gene is gelatinase A, a Type IV collagenase that contains three fibronectin Type II repeats in its catalytic site that allow binding of denatured Type IV and V collagen and elastin. |
| CLU | Clusterin. A protein encoded by this gene is a secreted chaperone that can also be found in the cell cytosol under some stress conditions. Evidence suggests that this protein is involved in several basic biological events such as cell death, tumor progression, and neurodegenerative disorders. |
| CXCL8 | C—X—C Motif Chemokine Ligand 8. The protein encoded by this gene is a member of the CXC chemokine family and is a major mediator of the inflammatory response. The encoded protein is secreted primarily by neutrophils where it serves as a chemotactic factor by guiding neutrophils to the infection site. The chemokine is a potent angiogenic factor. |

The genes described in Table 1 are implicated in repair and function of the epidermal barrier in additional to cellular respiration and energy production. The genes described in Table 2 are implicated in inflammation. Therefore, downregulation of those genes reduces inflammation and pushes the skin to a healthier state. When considered along with the upregulated genes described in Table 1, the metabolomics guided, bioprocess engineered sunflower sprout extract influenced twelve genes which target skin barrier repair, melanogenesis, cellular energy, inflammation, and extracellular matrix production. In contrast, one conventional extract formed from a sunflower shoot extract incubated with human keratinocytes exhibited two highly upregulated genes, i.e., filaggrin and gamma-cysteine ligase (previously known as gamma-glutamylcysteine synthetase), and three highly downregulated genes, i.e., MMP-1, MMP-3, and MMP-9. Thus, the sunflower shoot extract only influenced five genes targeting skin barrier repair and antioxidant production.

To demonstrate the effect of metabolites present in the conventional sunflower shoot extract, comparative gene expression of dermal fibroblasts was tested against a control. Human dermal fibroblasts were first treated with $H_2O_2$ to mimic the effect of senescence. A control group was then incubated in an incubation medium without the sunflower shoot extract and the experimental group was incubated in an incubation medium with the sunflower shoot extract. The control group showed downregulation of certain genes, e.g., CCN13, IGFBP2, PDGFR, CCNE1, P53, ACAN, COL3A1, and TMC, and upregulation of a gene that promotes ECM destruction, i.e., MMP-3. These results are consistent with senescence. When incubated in the presence of the sunflower shoot extract, the genes that were downregulated by $H_2O_2$, i.e., CCN13, IGFBP2, PDGFR, CCNE1, P53, ACAN, COL3A1, and TMC, were upregulated in the presence of the sunflower shoot extract, and the gene that was upregulated, i.e., MMP-3, was downregulated by the sunflower shoot extract. To compare the effects of the bioprocess engineered sunflower sprout extract, skin harvested from the abdomen of the female donor was also treated with $H_2O_2$ and then incubated in the presence of the bioprocess engineered sunflower sprout extract and the resultant gene expression was analyzed. Only genes exhibiting a significant fold change and a p-value less than 0.05 were considered to have differential expression. In comparing the table and list of genes above, there were not similarities in the genes exhibiting altered gene expression, leading to the conclusion that the different processes result in the formation of different metabolites having different antiaging effects.

In one embodiment, the metabolomics guided, bioprocess engineered sunflower sprout extract can be applied directly to the skin at a concentration of 100%. In another embodiment, the metabolomics guided, bioprocess engineered sunflower sprout extract can be mixed with a cosmetically acceptable carrier for application to the skin at a concentration that is less than 100% of the skincare composition. For example, between 0.25-25% of the skincare composition can be the metabolomics guided bioprocess engineered sunflower sprout extract. In another example, between 25-50% of the skincare composition can be the metabolomics guided bioprocess engineered sunflower sprout extract. In yet another example, greater than 50% of the skincare composition can be the metabolomics guided bioprocess engineered sunflower sprout extract. An exemplary method of forming a skincare composition is described in FIG. 2 that follows.

Figure 2:
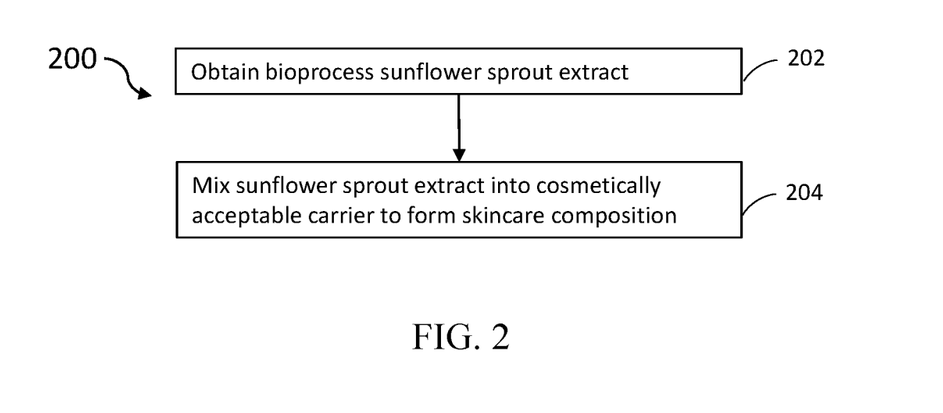
FIG. 2 is a flowchart of the steps for preparing a skincare composition using the metabolomics guided, bioprocess engineered sunflower sprout extract according to an illustrative embodiment.

FIG. 2 is a flowchart of the steps for preparing a skincare composition using the metabolomics guided bioprocess engineered sunflower sprout extract according to an illustrative embodiment. Flowchart 200 begins at Step 202 by obtaining a metabolomics guided, bioprocess engineered sunflower sprout extract formed by the process in flowchart 100. In Step 204, the metabolomics guided, bioprocess engineered sunflower sprout extract is optionally mixed into a cosmetically acceptable carrier. The cosmetically acceptable carrier can be a water-based or an anhydrous oil-based gel or an oil-in-water, water-in-oil, water-in-silicone, or water-free emulsion.

The skincare composition formed according to flowchart 200 in FIG. 2 can be used for ameliorating the effects of aging on human skin according to an illustrative embodiment. The skincare composition, which can include a cosmetically acceptable carrier mixed with a sunflower sprout extract obtained from sunflower seeds germinated in an environment enhanced with oxygen and an optimal concentration of sucrose solution, can be applied to human skin according to an application frequency for specific skin conditions. The skincare composition can also be applied according to an application frequency based on a desired result, such as an improvement in cellular energy, skin radiance, epidermal barrier repair, skin suppleness, increase in elasticity and firmness, and long-term skin health.

To qualify the efficacy of the novel skincare formulation, a pilot study was conducted with a small cohort of female and male participants in which the participants were instructed to apply the novel skincare formulation to their skin for two weeks. The participants were asked to evaluate the perceived efficacy of the skincare formulation in six different categories and provide a rating score from 0 to 5, which corresponds to a range of no perceived improvement (i.e., 0) to 100% improvement (i.e., 5) in 20% increments. The results of the perceived efficacy are depicted in FIGS. 3-8 that follow. The participants were also asked to evaluate the appeal of the skincare formulation in four different categories and provide a rating score from 0 to 5, which corresponds to a range of no opinion (i.e., 0) to 100% positive opinion (i.e., 5) in 20% increments. The results of the perceived appeal of the skincare product are depicted in FIGS. 9-12 that follow.

Figure 3:
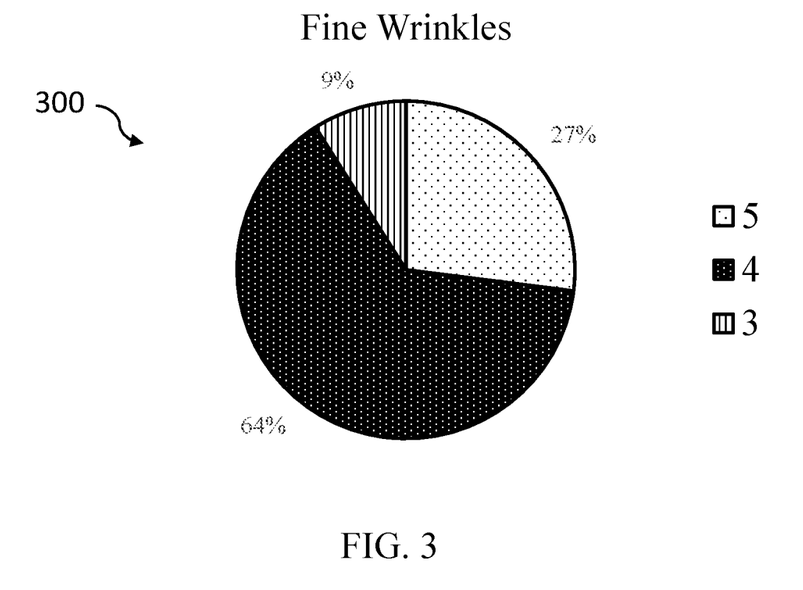
FIG. 3 is a chart depicting the perceived effect of the novel skincare formulation on the reduction of fine wrinkles.

FIG. 3 is a chart depicting the perceived effect of the novel skincare formulation on the reduction of fine wrinkles. From chart 300, it can be seen that all participants perceived the novel skincare formulation as reducing the expression of fine wrinkles. The majority of participants provided a score of 4 out of 5.

Figure 4:
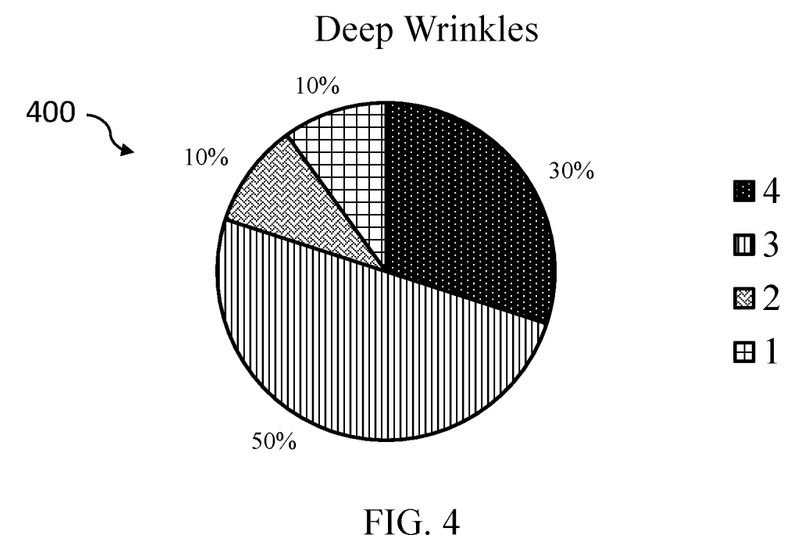
FIG. 4 is a chart depicting the perceived effect of the novel skincare formulation on the reduction of deep wrinkles.

FIG. 4 is a chart depicting the perceived effect of the novel skincare formulation on the reduction of deep wrinkles. From chart 400, it can be seen that all participants perceived the novel skincare formulation as reducing the expression of deep wrinkles. Half of the participants provided a score of 3 out of 5.

Figure 5:
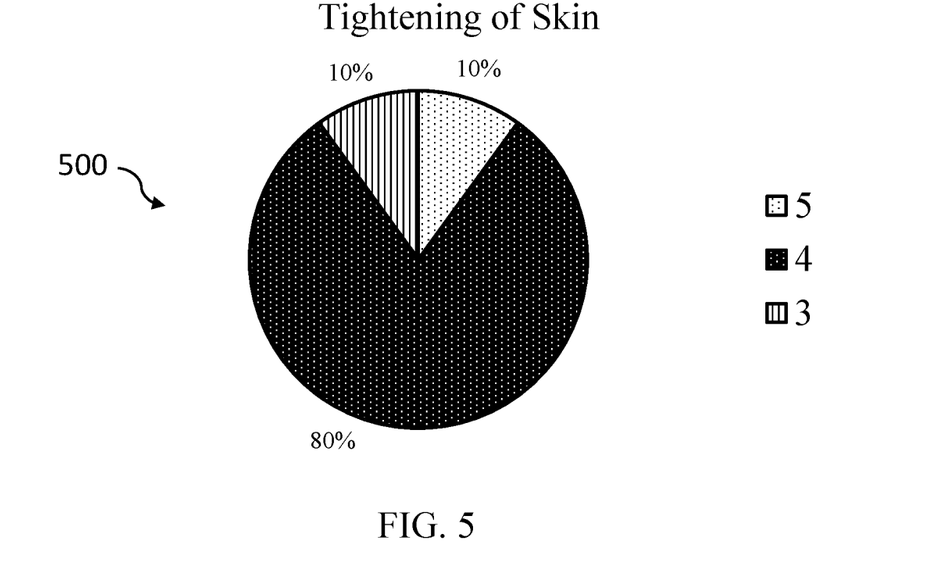
FIG. 5 is a chart depicting the perceived effect of the novel skincare formulation on improved skin tightening.

FIG. 5 is a chart depicting the perceived effect of the novel skincare formulation on improved skin tightening. From chart 500, it can be seen that all participants perceived the novel skincare formulation as improving skin tightening. The majority of participants provided a score of 4 out of 5.

Figure 6:
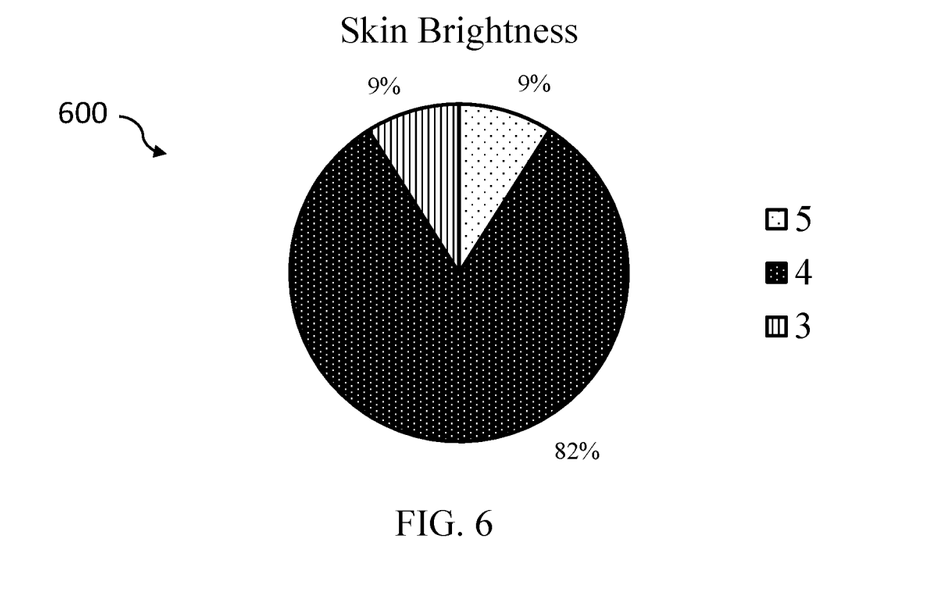
FIG. 6 is a chart depicting the perceived effect of the novel skincare formulation on improved skin brightening.

FIG. 6 is a chart depicting the perceived effect of the novel skincare formulation on improved skin brightening. From chart 600, it can be seen that all participants perceived the novel skincare formulation as improving skin brightening. The majority of participants provided a score of 4 out of 5.

Figure 7:
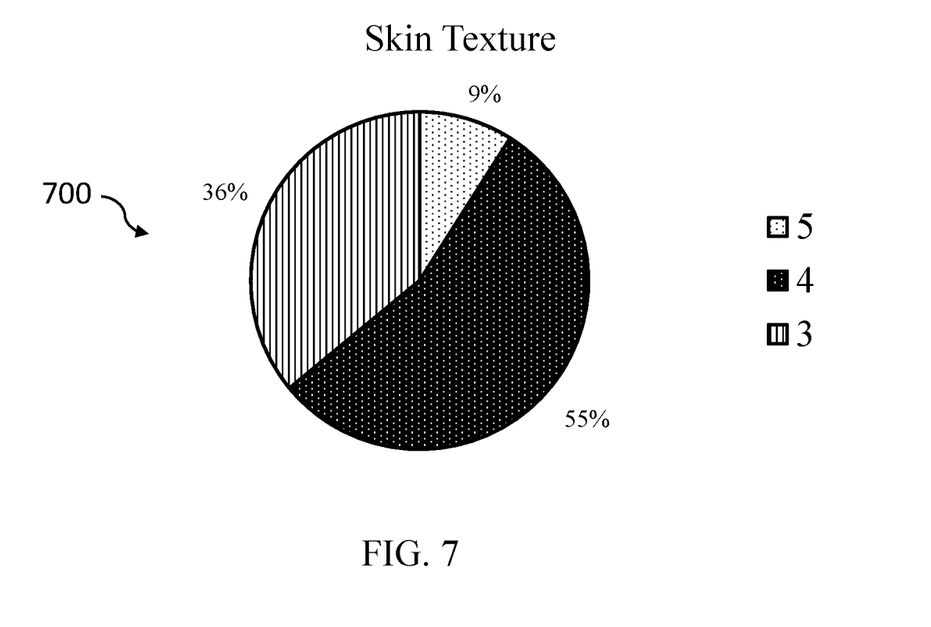
FIG. 7 is a chart depicting the perceived effect of the novel skincare formulation on improved skin texture.

FIG. 7 is a chart depicting the perceived effect of the novel skincare formulation on improved skin texture. From chart 700, it can be seen that all participants perceived the novel skincare formulation as improving skin texture. The majority of participants provide a score of 4 out of 5.

Figure 8:
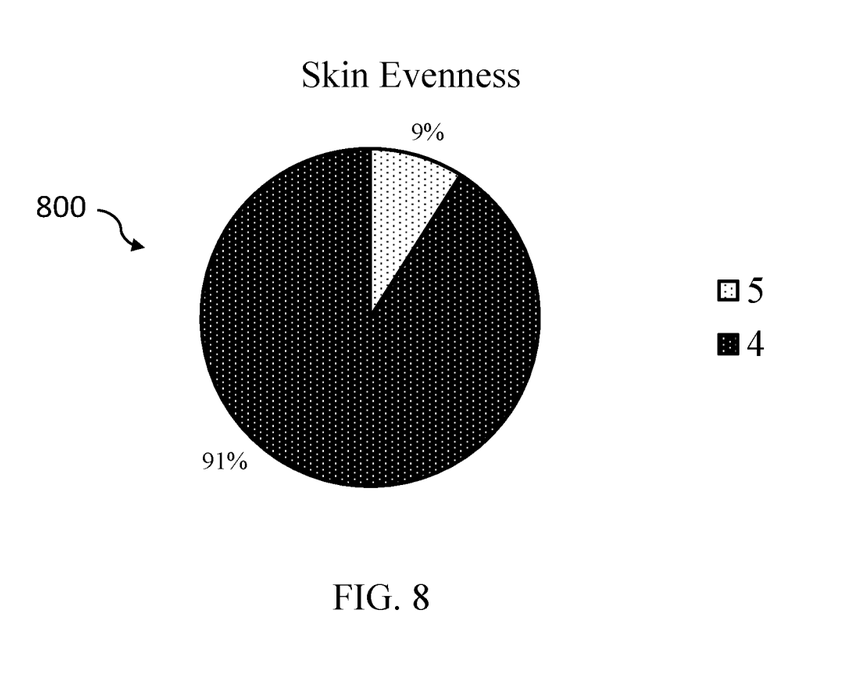
FIG. 8 is a chart depicting the perceived effect of the novel skincare formulation on improved skin evenness.

FIG. 8 is a chart depicting the perceived effect of the novel skincare formulation on improving skin evenness. From chart 800, it can be seen that all participants perceived the novel skincare formulation as improving skin evenness. The majority of participants provided a score of 4 out of 5.

The following table provides a statistical analysis of the results from the pilot study represented in FIGS. 3-8.

TABLE 3

| Skin Care Data Analysis | | | | | | |
|---|---|---|---|---|---|---|
| | Mean Score | Degrees of Freedom | t-Value | P-Value | 95% Lower | 95% Upper |
| Fine Wrinkles | 4.182 | 10 | 23.000 | <0.0001 | 3.777 | 4.587 |
| Deep Wrinkles | 3.000 | 9 | 10.062 | <0.0001 | 2.326 | 3.674 |
| Tightening of Skin | 4.000 | 9 | 26.833 | <0.0001 | 3.663 | 4.337 |
| Skin Brightness | 4.000 | 10 | 29.665 | <0.0001 | 3.700 | 4.300 |
| Skin Texture | 3.727 | 10 | 16.116 | <0.0001 | 3.293 | 4.162 |
| Skin Evenness | 4.091 | 10 | 45.000 | <0.0001 | 3.888 | 4.293 |

Figure 9:
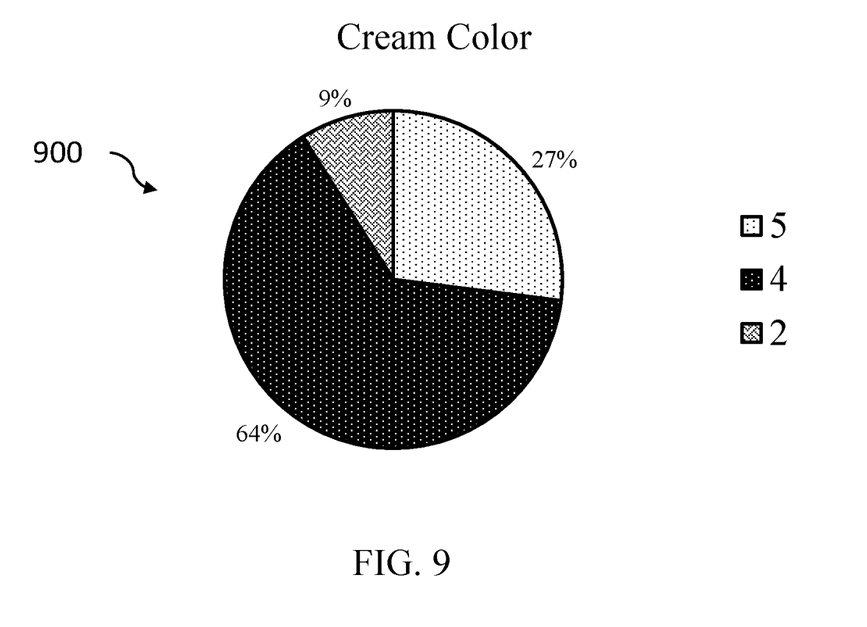
FIG. 9 is a chart depicting the appeal of the color of the skincare formulation in in accordance with an illustrative embodiment.

FIG. 9 is a chart depicting the appeal of the color of the skincare formulation in in accordance with an illustrative embodiment. From chart 900, it can be seen that all participants perceived the color of the novel skincare formulation appealing. The majority of participants provided a score of 4 out of 5.

Figure 10:
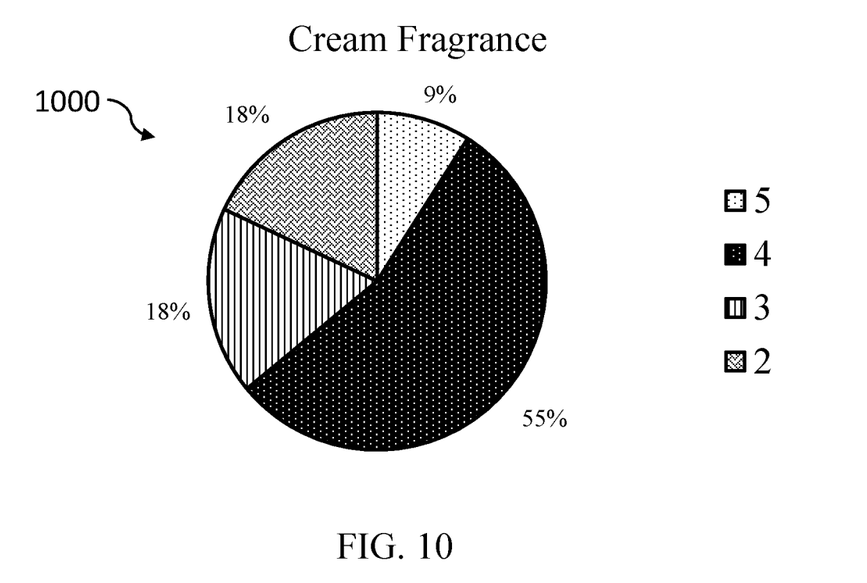
FIG. 10 is a chart depicting the appeal of the fragrance of the skincare formulation in in accordance with an illustrative embodiment.

FIG. 10 is a chart depicting the appeal of the fragrance of the skincare formulation in in accordance with an illustrative embodiment. From chart 1000, it can be seen that all participants perceived the fragrance of the novel skincare formulation appealing. The majority of participants provided a score of 4 out of 5.

Figure 11:
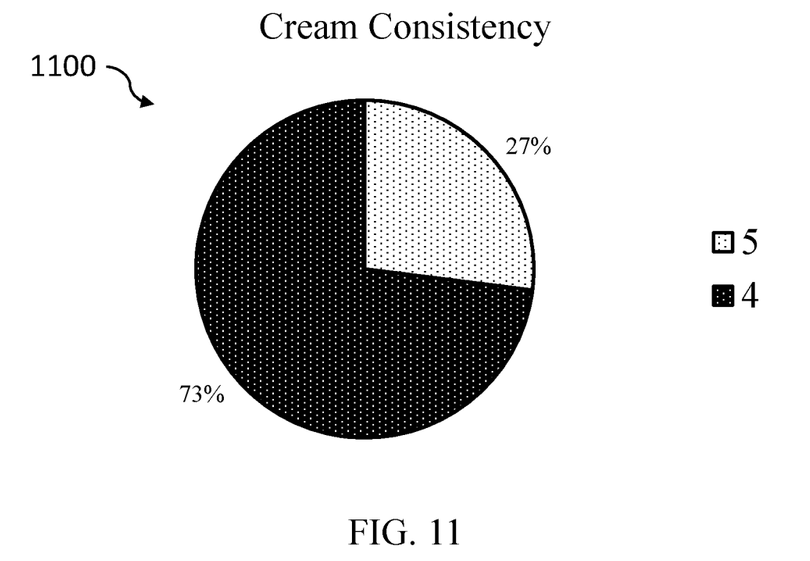
FIG. 11 is a chart depicting the appeal of the consistency of the skincare formulation in in accordance with an illustrative embodiment.

FIG. 11 is a chart depicting the appeal of the consistency of the skincare formulation in in accordance with an illustrative embodiment. From chart 1100, it can be seen that all participants perceived the consistency of the novel skincare formulation appealing. The majority of participants provided a score of 4 out of 5.

Figure 12:
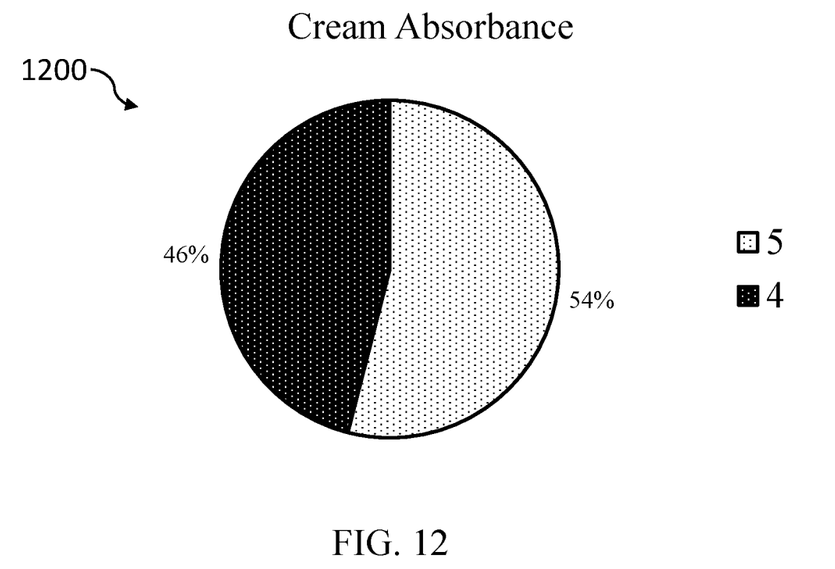
FIG. 12 is a chart depicting the appeal of the absorbency of the skincare formulation in in accordance with an illustrative embodiment.

FIG. 12 is a chart depicting the appeal of the absorbency of the skincare formulation in in accordance with an illustrative embodiment. From chart 1200, it can be seen that all participants perceived the absorbency of the novel skincare formulation appealing. The majority of participants provided a score of 5 out of 5.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A human skincare composition comprising:
   an enhanced extract from a sprout obtained from plant seeds germinated in an environment that is enriched and enhanced in oxygen and an effective concentration of a sucrose solution, wherein the plant seeds have lipid reserves not stored in its endosperms; and
   a cosmetically acceptable carrier mixed with the enhanced extract.

2. The human skincare composition of claim 1, wherein the plant seeds are sunflower seeds.

3. The human skincare composition of claim 2, wherein the effective concentration of sucrose solution is 2% w/v, and wherein an amount of the enhanced oxygen is 40% oxygen in a headspace of the sunflower seeds.

4. The skincare composition of claim 2, wherein the sunflower sprout extract comprises at least one of L-carnitine (LCAR), acetyl-L-carnitine (ALCAR), L-alpha-phosphatidylcholine, galactose phosphate, glucose phosphate, adenosine triphosphate, inositol, triglycerides, docosahexaenoic acid (DHA) and eicosapentaenoic acid (EPA).

5. The skincare composition of claim 1, wherein the plant seeds display an altered genomic expression from an unaltered genome.

6. The skincare composition of claim 5, wherein the altered genomic expression provides LCAR at an amount that is about 1000 times greater than an amount of LCAR provided by an unaltered genomic expression of the unaltered genome.

7. The skincare composition of claim 5, wherein the altered genomic expression provides ALCAR at an amount that is about 1000 times greater than an amount of ALCAR provided by an unaltered genomic expression of the unaltered genome.

8. A method of ameliorating the effects of aging on human skin, comprising:
   applying a skincare composition to human skin, the skincare composition comprising a cosmetically acceptable carrier mixed with an enhanced sprout extract obtained from plant seeds germinated in an environment that is enhanced and enriched in oxygen and an effective concentration of a sucrose solution, wherein the plant seeds have lipid reserves not stored in its endosperms.

9. The method of claim 8, wherein the plant seeds are sunflower seeds.

10. The method of claim 9, wherein the effective concentration of sucrose solution is 2% w/v, and wherein an amount of the enhanced oxygen is 40% oxygen in a headspace of the plant seeds.

11. The method of claim 9, wherein the enhanced extract comprises at least one of L-carnitine (LCAR), acetyl-L-carnitine (ALCAR), L-alpha-phosphatidylcholine, galactose phosphate, glucose phosphate, adenosine triphosphate, inositol, triglycerides, docosahexaenoic acid (DHA) and eicosapentaenoic acid (EPA).

12. The method of claim 8, wherein the plant seeds display an altered genomic expression from an unaltered genome.

13. The method of claim 12, wherein the altered genomic expression provides LCAR at an amount that is about 1000 times greater than an amount of LCAR provided by an unaltered genomic expression of the unaltered genome.

14. The method of claim 12, wherein the altered genomic expression provides ALCAR at an amount that is about 1000 times greater than an amount of ALCAR provided by an unaltered genomic expression of the unaltered genome.

15. The method of claim 8, wherein the skincare composition is applied to the human skin according to an application frequency for specific skin conditions.

16. The method of claim 15, wherein the skincare composition is applied daily to the human skin.

* * * * *